Jan. 20, 1959   R. E. BROWN ET AL   2,869,376
ROTARY TEST TABLE

Filed May 16, 1956   4 Sheets-Sheet 1

INVENTORS:
Ralph E. Brown
Herbert N. Stautz
BY
Smyth & Roston.
Attorneys.

Jan. 20, 1959 R. E. BROWN ET AL 2,869,376
ROTARY TEST TABLE
Filed May 16, 1956 4 Sheets-Sheet 2

INVENTORS:
Ralph E. Brown
Herbert N. Stautz
BY
Attorneys

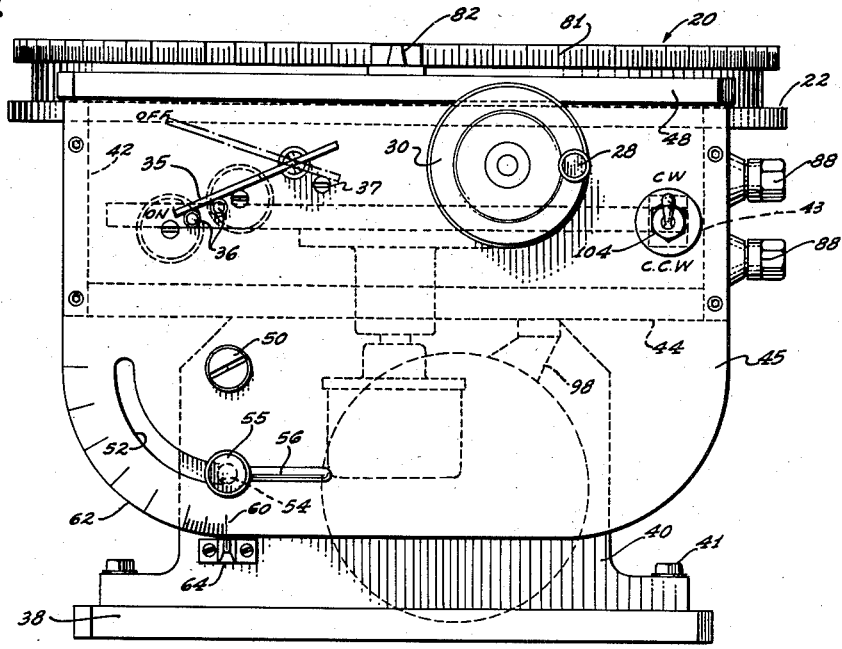

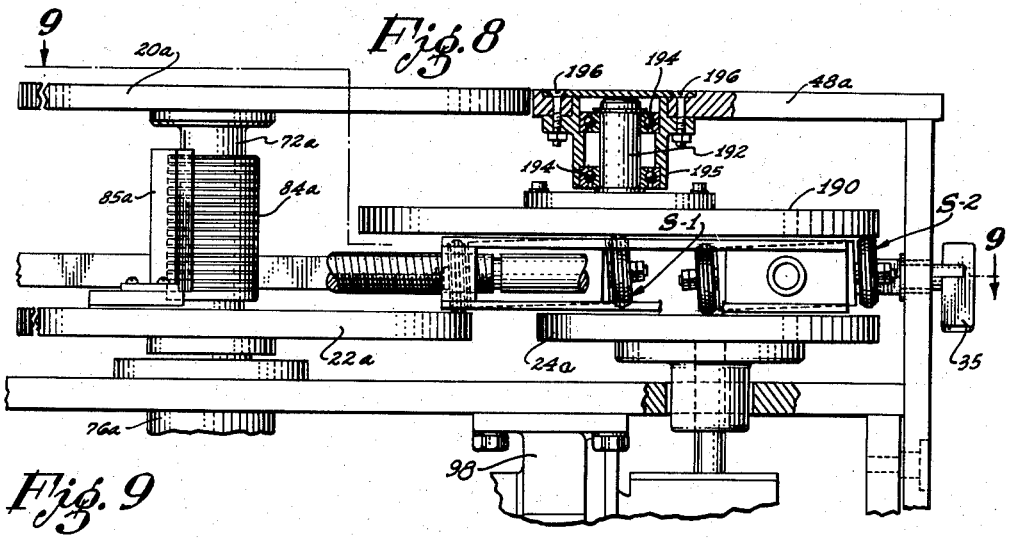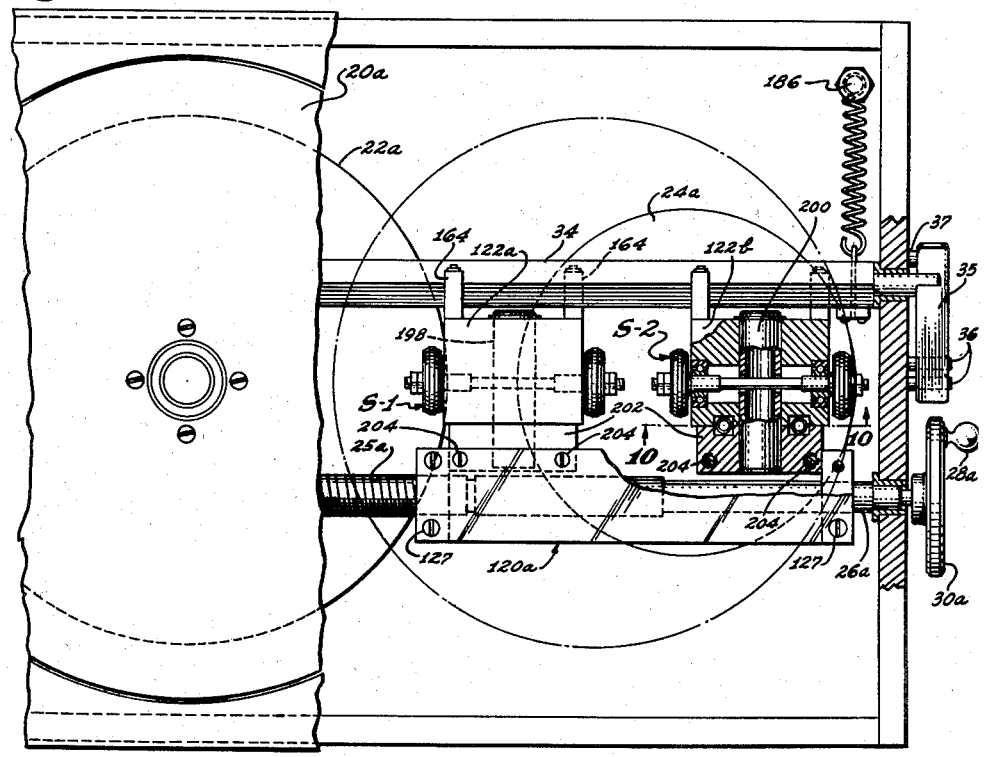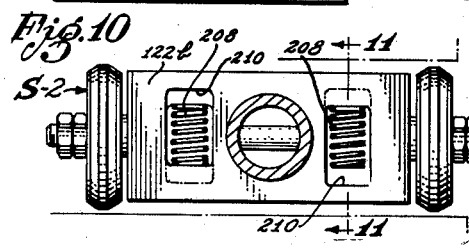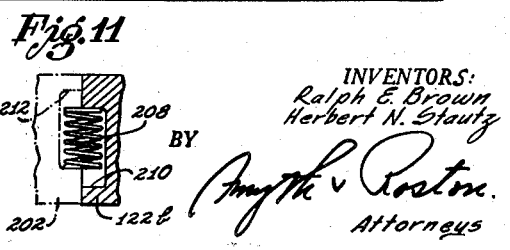

United States Patent Office 2,869,376
Patented Jan. 20, 1959

2,869,376

ROTARY TEST TABLE

Ralph E. Brown and Herbert N. Stautz, Los Angeles, Calif., assignors to Genisco, Incorporated, Los Angeles, Calif., a corporation Application May 16, 1956, Serial No. 585,262

16 Claims. (Cl. 74—200)

This invention relates to a variable speed rotary apparatus and more particularly refers to a rotary test apparatus incorporating a variable speed transmission mechanism. While the invention may be employed for various specific purposes in various fields, it has been initially embodied in a variable speed turntable for testing rotation-responsive devices such as gyroscopes and the like. This initial embodiment of the invention will be described herein for the purpose of disclosure and will provide adequate guidance for those skilled in the art who may have occasion to apply the same underlying principles to other specific purposes.

In a conventional apparatus of the present type, at least two rotary discs are operatively interconnected by rotary transmission means such as suitable ball means or the equivalent which ball means is movable radially of the two discs for speed regulation. For effective transmission of rotation from disc to disc, substantial pressure must be provided at the points where the ball means or the equivalent contacts the two discs. It is highly desirable, however, to remove this contact pressure when the apparatus is stationary because otherwise the ball means or equivalent may develop flat spots in the regions of sustained static pressure.

A common solution for this problem of avoiding flat spots is to make at least one of the discs axially movable. In such an arrangement, the desired pressure at the points of contact may be provided by exerting pressure axially against the axially movable disc, the disc being retractable to relieve the ball means or equivalent of the contact pressure when the apparatus is idle. This solution complicates the construction.

A feature of the present invention is the replacement of the usual ball means by an axially elongated rotary transmission means that makes it unnecessary to provide axial movement in the mounting of a disc. Preferably the elongated transmission means is in the form of a spool. This spool is tilted to an effective or operating position for operatively connecting the associated two discs, one end of the tilted spool contacting one of the two discs and the other end contacting the other disc. It is a simple matter to provide suitable spring means for the dual purpose of tilting the transmission spool to its operating position and of providing contact pressure of predetermined magnitude between the spool and each of the two discs. A special feature of the invention is the further concept of mounting the transmission spool on a movable pivot that makes the spool self-adjusting for equalization of its contact pressure against the two discs. It is also a simple matter to tilt the transmission spool out of contact with both discs thereby to remove the contact pressure when the apparatus is idle.

Merely providing mechanical means for relieving contact pressure is not enough, however, to insure that the contact pressure will actually be removed every time the apparatus stops. Too often the operator fails to manipulate such a mechanical means and thus leaves the transmission means under contact pressure over an idle period that may extend for hours. To meet this problem the present invention provides means that may be depended upon to remove the contact pressure automatically whenever the apparatus is deenergized.

In this regard, a feature of the invention is the concept of providing a single control that both governs actuation of a drive disc and governs the tilt of a transmission spool that operatively connects the drive disc with an associated driven disc. A further feature of the preferred practice of the invention is the concept of making this automatic means "fail-safe." For this purpose the drive disc in the preferred practice of the invention is actuated by an electric motor and spring means continually urges this single control to its stop position. An electrically responsive latch holds the single control means in its effective or operating position in opposition to the spring means but whenever the motor circuit is deenergized, the electrically responsive latch automatically releases the single control means to permit the spring means to return the single control means to its stop position. Since the electrically responsive latch must be electrically energized to hold the single control in its effective position in opposition to the spring means, a failure of the energizing circuit or the inadvertent disconnection of an electrical plug will cause the single control means to return to its stop position with consequent retraction of the transmission spool out of pressure contact with the two discs.

A further feature of the invention is that it affords a relatively high degree of accuracy and yet may be embodied in a relatively small device of relatively light weight for convenient portability. Such a device may be readily lifted and carried from bench to bench.

The various features and advantages of the invention may be understood from the following detailed description considered with the accompanying drawings.

In the drawings, which are to be regarded as merely illustrative:

Figure 4 is an end elevation of the same embodiment of the invention;

Figure 5 is a fragmentary view, partly in section and partly in plan, showing how a transmission spool may be rotatably mounted to tilt between a normal ineffective position and an effective or operating position;

Figure 6 is a fragmentary side elevational view showing the transmission spool and an adjacent portion of a control bar that is operatively associated therewith;

Figure 7 is an end elevation of the transmission spool with the associated control bar shown in section;

Figure 8 is a fragmentary view partly in side elevation and partly in section showing a second embodiment of the invention incorporating a train of three discs, the three discs being operatively interconnected by two transmission spools;

Figure 9 is a fragmentary plan view of this second embodiment of the invention with portions broken away to reveal concealed structure;

Figure 10 is a section taken as indicated by the line 10—10 of Figure 9 showing the construction of one of the transmission spool assemblies; and Figure 11 is a fragmentary section along the line 11—11 of Figure 10 showing how spring means acts to tilt a transmission spool in this second embodiment of the invention.

General arrangement

Figure 1:
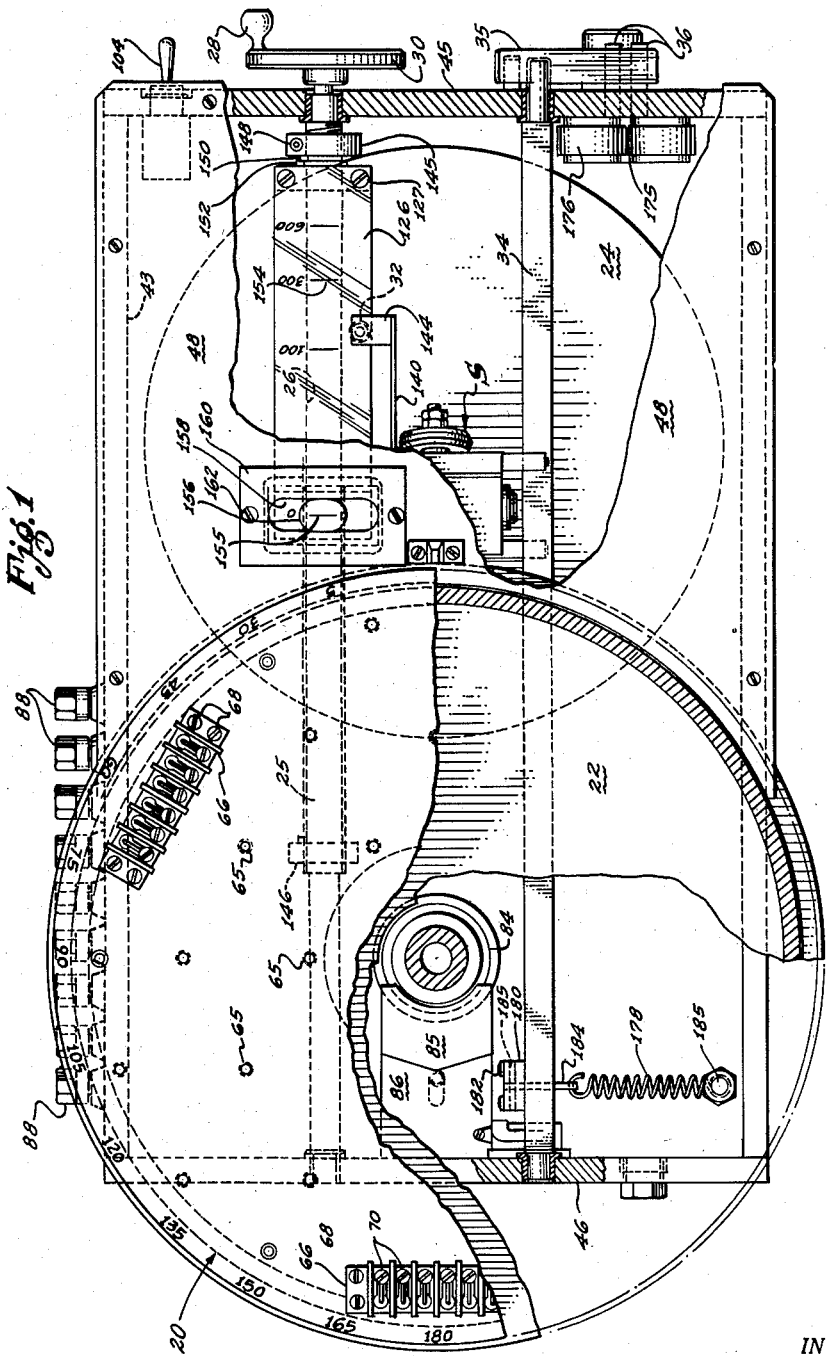
Figure 1 is a plan view of the preferred embodiment of the invention with parts broken away to reveal concealed structure.
Figures 2, 3:
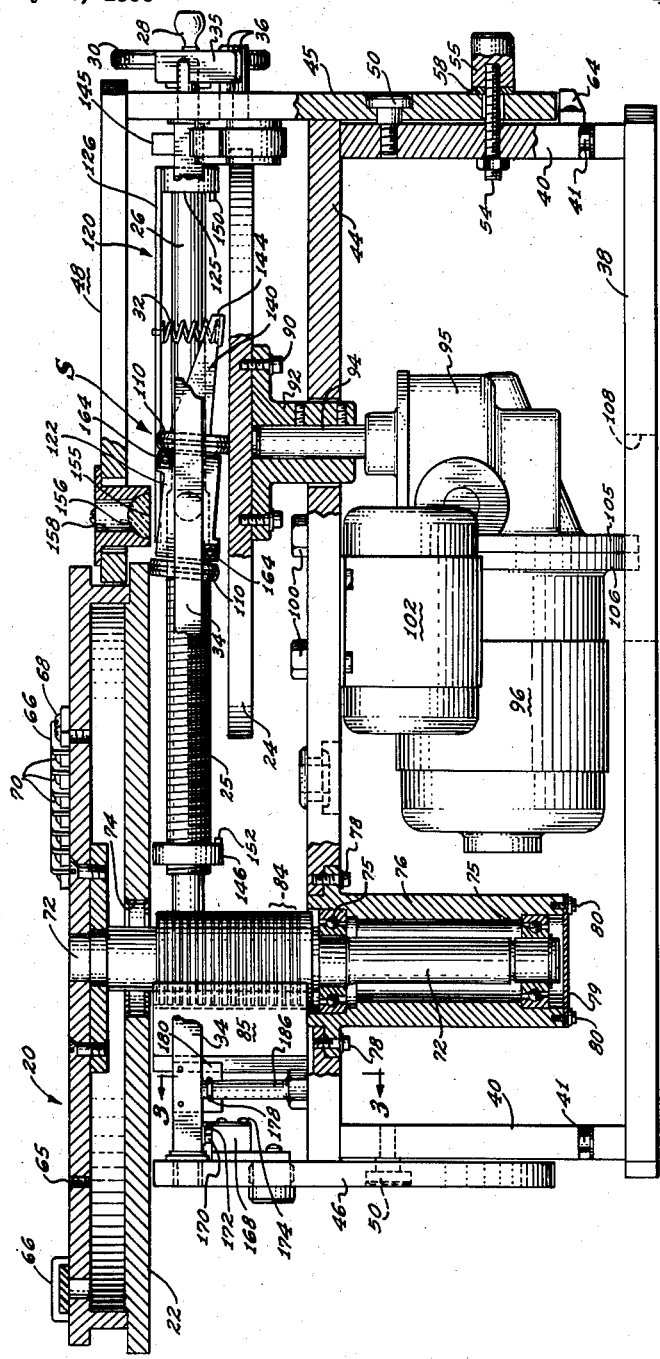
Figure 2 is a front elevational view of the same embodiment of the invention with a front plate removed and with parts broken away.
Figure 3 is a fragmentary section taken as indicated by the line 3—3 of Figure 2 showing spring means that tends to return the single control to its normal stop position.

The principal parts of the first embodiment of the invention shown in Figures 1-7 include a turntable 20; a downwardly facing driven disc 22 unitary with the turntable on the underside thereof; an upwardly facing drive disc 24, the two discs being in parallel spaced planes; and a rotary transmission means in the form of a transmission spool generally designated by the letter S. As shown in Figure 2, the transmission spool S in its effective position is tilted with one end of the spool in rolling contact with the drive disc 24 and the other end in rolling contact with the driven disc 22.

For the purpose of varying the rate of rotation of the turntable 20 relative to the rate of rotation of the drive disc 24, the transmission spool S is movable radially of both of the two discs 22 and 24 by means of a screw thread 25 on an adjustment shaft 26. The adjustment shaft 26 may be rotated as required by a crank 28 on an adjustment wheel 30 on one end of the shaft. Suitable spring means in the form of a compression spring 32 urges the transmission spool S towards its effective tilted position and provides the contact pressure on the part of the transmission spool against the two discs 22 and 24.

The single control means of the preferred practice of the invention comprises a non-circular bar 34, in this instance a square bar, that may be rotated 45° to a normal canted position to retract the operating spool S by tilting action out of contact with the two discs 22 and 24. As shown in Figure 4, the control bar 34 has a control handle 35 that is movable between the "off" position shown in dotted lines and the "on" position shown in solid lines. When the control handle 35 is moved to its "on" position, it closes a power circuit for actuation of the drive disc 24 and at the same time, energizes an electromagnetic latch having two pole pieces 36. At its "off" position, the control handle 35 abuts a stop stud 37 and at its "on" position, the handle lies against the pole pieces 36 and is magnetically latched thereby. To stop the turntable, it is merely necessary to lift the control handle 35 manually away from the pole pieces 36 of the electromagnet whereupon the electromagnet is de-energized and the power circuit is opened to permit the turntable to come to a stop.

Details of the preferred embodiment of the invention

The moving parts of the apparatus are preferably carried by an upper frame which is mounted on a base frame for rotation relative thereto about a horizontal tilt axis. The base frame comprises a base plate 38 and two upright pedestal plates 40 that are mounted on the opposite ends of the base plate by suitable screws 41 (Figure 4). The upper frame includes front and rear plates 42 and 43 (Figure 4), a normally horizontal longitudinal plate 44, two end plates 45 and 46, and a relatively short top plate 48.

The two end plates 45 and 46 of the upper frame straddle the two pedestal plates 40 of the base and are pivotally connected thereto by suitable pivot studs 50 to permit the upper frame to tilt adjustably about the horizontal axis. For the purpose of securing the upper frame at various angles of inclination, the end plate 45 may be formed with a 90° arcuate slot 52 that is concentric to the tilt axis. As shown in Figures 2 and 4 a suitable screw 54 is fixedly mounted in the adjacent pedestal plate 40 in position extending through the slot 52 and a suitable clamping nut 55 is threaded onto this screw. The clamping nut 55 may be provided with a radial handle 56 and may be further provided with a unitary washer 58 of suitable material, for example rubber-like material, for frictional engagement with the end plate 45 of the upper frame. It is apparent that the clamping nut 55 may be loosened to permit the upper frame to be tilted to any selected angle within the range of 90° and that the clamping nut 55 may then be tightened to immobilize the upper frame at the selected angle of inclination. A suitable scale 60 calibrated in terms of degrees may be provided adjacent a concentric arcuate edge 62 of the end plate 45 to be read with reference to a fixed index member 64 on the adjacent pedestal 40.

The turntable 20 is provided with numerous threaded bores 65 to permit test objects and devices to be anchored thereon by suitable screws and is further provided with a plurality of molded blocks 66 of nonconducting material secured thereto by screws 68. The molded blocks 66 carry various terminal screws 70 to permit test instruments to be connected into circuits as may be desired. The turntable 20 is mounted on the upper end of a shaft 72 that extends through a central aperture 74 in the driven disc 22 and is journalled in a pair of spaced bearings 75. The spaced bearings 75 are carried by a bearing sleeve 76 that is mounted in a corresponding aperture in the frame plate 44 and is secured in position by suitable screws 78. The lower end of the bearing sleeve 76 is provided with a cover plate 79 removably secured by suitable screws 80. Preferably, the cylindrical rim of the turntable 20 is provided with a scale 81, as may be seen in Figure 4, and a suitable index member 82 is mounted on the top wall 48 adjacent the turntable rim.

The turntable shaft 72 carries a slip ring assembly 84, the various ring elements of which are connected to the terminal screws 70 by corresponding wires (not shown) that extend through the shaft 72. A corresponding brush assembly 85 (Figure 1) adjustably supported by a bracket 86 is connected by wiring (not shown) with external terminal screws 88 (Figure 1 and 4) on the side plate on the upper frame. Thus wires may be connected to the terminal screws 70 to place test devices on the turntable 20 in external circuits as may be desired.

The drive disc 24 is mounted by screws 90 on a hub member 92 and the hub member in turn is mounted on an upright drive shaft 94. The drive shaft 94 is actuated by gearing in a gear case 95 and the gearing in turn is actuated by a suitable motor 96. The motor 96 is mounted on the underside of the frame plate 44 by a bracket 98 shown in dotted lines in Figure 4, the bracket being secured to the frame plate by suitable screws 100. The motor 96 is a reversible motor having a capacitor 102 associated therewith, the direction of rotation of the motor being governed by a two-position selector switch 104. The gear case 95 and the motor 96 have abutting circular flanges 105 and 106, respectively, which normally extend into the plane of the base plate 38, the base plate having an aperture 108 indicated by dotted lines in Figure 2 to clear these two flanges.

The transmission spool S preferably comprises a pair of transmission wheels 110 that are fixedly mounted on a common axle 112. Preferably, each of the transmission wheels 110 is provided with a tread or tire 114 of suitable plastic or rubber-like material for non-slipping rolling contact with the corresponding disc.

The rim of each of the transmission wheels 110 is preferably of tapered cross-sectional configuration. In the construction shown, the rim configuration of each transmission wheel 110 provides a narrow central cylindrical portion 115 (Figure 5) flanked by two conical portions 116 so that when the transmission spool is tilted to its effective position, the two transmission wheels make line contact with the corresponding disc, the line contact being along the junction of the cylindrical portion 115 with one of the adjacent conical portions 116.

Various arrangements may be provided in various practices of the invention for mounting the transmission spool S as well as for controlling the tilt of the transmission spool. In this particular embodiment of the invention, what may be termed a main carriage, generally designated 120, is internally threaded for engagement with the previously mentioned thread 25 of the adjustment shaft 26 for movement along the adjustment shaft. The transmission spool S is journalled in what may be termed an auxiliary carriage 122 that is rotatably mounted on the main carriage 120 to swing the transmission spool between its two positions in response to rotation of the control bar 34.

The main carriage 120 may comprise a nut member 124 in engagement with the thread 25 and a block 125 (Figure 2) in sliding contact with a polished portion of the adjustment shaft 26, the nut member and block being interconnected by an elongated carriage plate 126 attached thereto by screws 127. The nut member 124 has an integral tubular spindle 128 on which the auxiliary carriage 122 is journalled.

As shown in Figure 5, the auxiliary carriage 122 may comprise a block of metal having two large intersecting bores 129 and 130. Spaced bearing bushings 132 mounted in the bore 129 rotatably embrace the spindle 128. The transmission spool S is journalled in the bore 130 by means of ball bearings 134 that embrace corresponding hub extensions 135 of the two transmission wheels 110. The two transmission wheels 110 are secured to the axle 112 by rubber-like washers 136 and nuts 137. This arrangement provides what may be termed an adjustable slip clutch. The nuts 137 are adjusted tight enough to transmit driving force from disc to disc but loose enough to keep the transmission wheels from skidding when the turntable is stopped. The axle 112 extends through a pair of diametrical apertures 138 in the tubular spindle 128, these apertures being circumferentially elongated to permit the required range of tilt of the axle relative to the spindle.

For cooperation with the previously mentioned compression spring 32, the auxiliary carriage 122 may have an arm 140 rigidly mounted thereon by suitable screws 142. The outer end of the arm 140 has a laterally extending flange 144 for pressure contact with the lower end of the compression spring 32, the upper end of the compression spring bearing against the underside of the plate 126 of the main carriage, as best shown in Figure 2. It is apparent that with the compression spring 32 urging the auxiliary carriage 122 clockwise about the axis of the hollow spindle 128, as viewed in Figure 2, one of the two transmission wheels 110 is in pressure contact with the drive disc 24 and the other is in pressure contact with the driven disc 22.

The range of movement of the main carriage 120 along the adjustment shaft 25 is limited by a pair of stop collars 145 and 146 (Figure 2) that are adjustably threaded onto the adjustment shaft 26. Each of these two stop collars is of split construction and is provided with a screw 148 (Figure 1) that may be tightened to immobilize the stop collar. Each stop collar has a short stop pin 150 for cooperation with a corresponding stop pin 152 that is mounted on the corresponding end of the main carriage, these two stop pins moving circumferentially into abutment at the corresponding limit positions of the main carriage.

Preferably, suitable scale means is provided to indicate the various positions of the main carriage 120. Thus Figure 1 shows a scale 154 on the carriage plate 126, this scale being calibrated in terms of degrees per second of the turntable 20. The required index means for cooperation with the scale 154 may comprise a crosshair 155 on the bottom of an oval lens 156. The oval lens 156 is mounted in an elongated opening 158 in a frame 160 that is mounted in the top plate 48 and secured thereto by suitable screws 162.

It is important to note that the main carriage is rotatably mounted on the adjustment shaft 26 and therefore the radial spindle 128 is free to swing slightly between the two discs 22 and 24. Thus the transmission spool S is free for self-adjustment to seek a position of equalized pressure against the two discs.

It is apparent that the structure described to this point comprises an operative mechanism since rotation of the drive disc 24 by the motor 96 will result in rotation of the turntable 20 by virtue of the tilted transmission spool S. The speed of rotation of the turntable depends upon the position of the main carriage 120 as determined by rotary adjustment of the adjustment shaft 26. The preferred practice of the invention, however, further provides for tilting of the transmission spool S to a retracted position out of contact with the two discs 22 and 24 when the apparatus is not in operation. As heretofore stated, it is further contemplated that the arrangement will be such that the transmission spool S will be retracted automatically whenever the motor is deenergized to stop the turntable.

To provide this additional control, a pair of spaced lugs or fingers 164 on the auxiliary carriage 122 straddle the control bar 34, the two fingers being on opposite sides of the spindle 128. Each of the fingers 164 may comprise an elongated block of metal that is mounted on the auxiliary carriage by means of a dowel pin 165 (Figure 5), the outer end of the dowel pin being provided with a retaining element 166.

When the control bar 34 is positioned with its opposite faces parallel to the two control fingers 164 as shown in Figure 2, the compression spring 32 holds the auxiliary carriage 122 in its effective tilted position for pressure contact by the transmission wheels 110 against the two discs 22 and 24. When the control bar 34 is rotated about its axis 45° from this operating position to the normal canted position shown in Figures 6 and 7, the control bar spreads the two control fingers 164 apart vertically against the opposition of the spring 32 and thereby rotates the auxiliary carriage 122 to a substantially horizontal position at which the two transmission wheels 110 are retracted out of contact with the two discs 22 and 24.

In order that the control bar 34 may serve as a single control for both the motor 96 and the auxiliary carriage 122, a suitable switch 168 is mounted on the frame end wall 46 adjacent the underside of the control bar to be actuated by the 45° cant of the control bar. The switch 168 has an operating button 170 and is closed whenever the operating button is free from pressure. The button is depressed by the control bar to open the switch whenever the control bar is rotated to its normal canted position that retracts the transmission spool S away from the two discs. An angular leaf spring 172 mounted on the side of the switch by screws 174 extends between the operating button 170 and the control bar 34 for wiping contact with the bar to prevent wearing the operating button 170.

The closing of the switch 168 not only energizes the motor 96 for actuation of the drive disc 24 but also energizes the electro-magnet having the previously mentioned pole pieces 36. The two pole pieces 36 are interconnected at their inner ends by a ferro-magnetic plate 175 (Figure 1) to complete the magnetic circuit and each pole piece is surrounded by a coil 176.

To keep the spring 32 and residual magnetism in the pole pieces 36 from holding the handle 28 in its "on" position when the electro-magnet is deenergized, a suitable spring 178 is provided, as shown in Figures 1 and 3 to urge the control bar to its normal position. For this purpose, a small metal block 180 may be mounted on one face of the control bar 34 by suitable screws 182. This block is slotted to receive a link 184 that is connected thereto by a pin 185 (Figures 1 and 3). The second end of the link 184 is connected to one end of the spring 178 and the other end of the spring is anchored to an upright stud 186 on the frame plate 44.

The manner in which the described apparatus functions to serve its purpose may be readily understood from the foregoing description. When the apparatus is out of operation with the motor 96 deenergized, the square control shaft 34 is in its normal canted position shown in Figures 6 and 7 and the auxiliary carriage 122 is in its normal substantially horizontal position shown in Figures 6 and 7 with the two transmission wheels 110 retracted out of contact with the two discs 22 and 24. The handle 28 of the control bar 34 is held against the stop stud 37 by the force of the spring 178 and the two coils 176 of the electro-magnet are deenergized.

When an object or instrument to be tested is mounted on the turntable 20, the selector switch 104 is positioned for the desired direction of rotation of the turntable and the crank 28 is manipulated for rotation of the adjustment shaft 26 to bring the desired value of the scale 154 into register with the crosshair 155 of the lens 156. The control handle 35 is then rotated downward from its "off" position to its "on" position against the two pole pieces 36 of the electro-magnet. This manipulation of the control handle 35 rotates the control bar 34 from its canted position to its flat position permitting the compression spring 32 to tilt the auxiliary carriage 122 thereby to tilt the transmission spool S into pressure contact with the discs 22 and 24. This 45° rotation of the control bar 34 causes the switch 168 to close for energization of the motor 96 and for energization of the two coils 176 of the electro-magnet. With the electro-magnet energized, the control handle 35 is held magnetically against the two pole pieces 36.

The speed of rotation of the turntable 20 may be ascertained by means of a stroboscopic lamp. If the turntable is rotating at an exceedingly slow rate, however, the rotation of the scale 81 on the periphery of the turntable with reference to the index 82 may be observed and timed with the aid of a stop watch to ascertain the precise rate of rotation.

To terminate a test operation, the handle 35 is manually lifted away from the two pole pieces 36 whereupon the resultant canting of the control bar 34 causes the switch 168 to open for deenergization of the motor 96 and for simultaneous deenergization of the coils 176 of the electro-magnet. In the event that the power circuit fails or in the event that a plug is disconnected to break the power circuit, the electro-magnet coils 176 as well as the motor 96 will be deenergized and the spring 178 acting in opposition to the residual magnetism in the two pole pieces 36 will rotate the control bar 34 to its "off" position. This rotation of the control bar acting in opposition to the compression spring 32 spreads the two control fingers 164 of the auxiliary carriage vertically to rotate the auxiliary carriage 122 back to its normal position at which the two transmission wheels 110 are out of contact with the two discs 22 and 24.

*The second embodiment of the invention*

The second embodiment of the invention shown in Figures 8-11 inclusive, is similar in principle and operation to the first described embodiment, as indicated by the use of corresponding numerals to designate corresponding parts. In brief, this second embodiment differs from the first embodiment in having three discs instead of two, the three discs being interconnected by two transmission spools, and in having a different spring arrangement for providing pressure contact between the transmission spools and the discs.

The turntable 20a is mounted on a hollow shaft 72a that is journalled in the manner heretofore described in a bearing sleeve 76a. An upwardly facing driven disc 22a is mounted on the hollow shaft 72a at substantial spacing below the turntable 20a and a slip ring assembly 84a together with a cooperating brush assembly 85a are positioned between the turntable and the driven disc. The driven discs 22a is operated by a transmission spool S-1 that is in turn actuated by contact with a downwardly facing intermediate idler disc 190.

The intermediate idler disc 190 is mounted on the lower end of an upwardly extending stub shaft 192 that is journalled in ball bearings 194. The ball bearings 194 are mounted in a bearing sleeve 195 that, in turn, is mounted on the underside of the top plate 48a by suitable screws 196. The intermediate idling disc 190 is actuated by a drive disc 24a by means of a second transmission spool S-2.

A main carriage 120a is mounted in the previously described manner on an adjustment shaft 26a having a threaded portion 25a. The first transmission spool S-1 is journalled in an auxiliary carriage 122a that, in turn, is journalled on a spindle 198 and the second transmission spool S-2 is journalled in a second auxiliary carriage 122b that is in turn journalled on a second spindle 200, the two spindles extending rigidly from the carriage 120a. As shown in Figure 9, each of the two spindles 198 and 200 is fixedly mounted in a block 202 that is mounted on the underside of the main carriage 120a by suitable screws 204.

As shown in Figures 9, 10 and 11, a pair of compression springs 208 is associated with each of the auxiliary carriages 122a and 122b to tilt the auxiliary carriages to their effective positions at which the corresponding transmission spools S-1 and S-2 are in pressure contact with the corresponding discs. Each of the two compression springs associated with each auxiliary carriage is concealed in a space that is formed by a recess 210 in the auxiliary carriage and a corresponding recess 212 in the block 202. When the two auxiliary carriages 122a and 122b are in their normal horizontal positions, the two recesses 210 and 212 associated with each of the compression springs 208 are off-set from each other to compress the spring as may be seen in Figure 11. Thus if the two auxiliary carriages 122a and 122b are free to rotate, the confined compression springs 208 rotate the auxiliary carriages to tilt the corresponding transmission spools S-1 and S-2 to their effective positions.

Both of the two auxiliary carriages 122a and 122b are operatively associated with a square control bar 34 in the manner as heretofore described, each auxiliary carriage having a pair of control fingers 164 straddling the control bar.

It is apparent that this second embodiment of the invention operates in the same manner as the first described embodiment. The two transmission spools S-1 and S-2 may be shifted by rotation of the crank 28a to selected positions for selected rates of rotation of the turntable 20a and the control handle 35 may be manipulated in the same manner as heretofore described with the same results.

Our description in specific detail of selected embodiments of the invention will suggest various changes, substitutions and other departures from our disclosure that properly lie within the spirit and scope of the appended claims.

We claim:

1. In a variable speed device of the character described, the combination of: a rotary drive disc; a rotary driven disc, said two discs facing each other and being axially offset from each other in spaced parallel planes and fixed against axial movement towards each other; a carriage movable between said planes along a path radially of both of said discs; rotary transmission means on said carriage, said rotary transmission means being tiltable between an idle position out of contact with both discs and an operating position with two axially spaced circumferential surface portions of the rotary transmission means in rolling contact with the two discs, respectively, to transmit rotation from the drive disc to the driven disc, the axis of tilt of said transmission means being free to move laterally of the planes of the two discs to permit self-adjustment of the transmission means for equalized pressure against the two discs; and means to shift said carriage along said path for different rates of rotation of said driven disc and to tilt said rotary transmission means to its idle position and to its normal operative position selectively.

2. A combination as set forth in claim 1 which includes spring means carried by the carriage to tilt said transmission means and to create the equalized pressure.

3. In a variable speed device of the character described, the combination of: a drive disc; a rotary driven disc, said two discs facing each other and being axially offset from each other in spaced parallel planes; power means to actuate said drive disc; rotary transmission means movable between said planes along a path radially of both discs, said rotary transmission means having a normal idle retracted position out of contact with both discs and an operating position in contact with both discs to transmit rotation from said drive disc to said driven disc; and automatic means to shift said rotary transmission means from its idle position to its operating position when said drive disc is energized and to shift the rotary transmission means to its normal idle position when said drive disc is deenergized.

4. In a variable speed device of the character described, the combination of: a rotary drive disc; a rotary driven disc, said two discs facing each other and being axially offset from each other in spaced parallel planes; rotary transmission means movable between said planes along a path radially of both said discs, said rotary transmission means having a normal idle retracted position out of contact with both discs and an operating position in contact with both discs to transmit rotation from said drive disc to said driven disc; power means to actuate said drive disc; means to control energization of said power means; and means responsive to said control means to shift said rotary transmission means from its idle position to its operating position when the power means is energized and vice versa.

5. In a variable speed device of the character described, the combination of: a rotary drive disc; a rotary driven disc, said two discs facing each other and being axially offset from each other in spaced parallel planes; a carriage movable between said planes along a path radially of both of said discs; rotary transmission means on said carriage, said rotary transmission means being tiltable between an idle position out of contact with both discs and an operating position with two axially spaced portions of the rotary transmission means in rolling contact with the two discs, respectively, to transmit rotation from the drive disc to the driven disc; means to adjust the position of the carriage along said path; and an elongated control member parallel with said path in contact with said carriage, said rotary transmission means being tiltable from its idle position to its operating position in response to rotation of said control member from an idle position to an operating position and vice versa.

6. A combination as set forth in claim 5 which includes power means responsive to rotation of said control member to actuate said drive disc.

7. A combination as set forth in claim 4 which includes: a motor to actuate said drive disc; a circuit to energize said motor in response to rotation of said control member from its normal idle position to its operating position; yielding means to urge said control member from its operating position to its idle position; and means to latch said control member in its operating position in opposition to said yielding means, said latch means being releasable in response to deenergization of said circuit, whereby deenergization of said circuit causes the drive disc to stop and causes said rotary transmission means to shift from its operating position to its idle position.

8. A combination as set forth in claim 7 in which said latch means is an electromagnet to hold said control member in its operating position by magnetic attraction.

9. In a variable speed device of the character described, the combination of: a rotary driven disc; a rotary drive disc, said two discs facing each other and being axially offset from each other in spaced parallel planes; an adjustment screw extending between said planes; a main carriage in threaded engagement with said screw to travel longitudinally thereof in response to rotation thereof; an auxiliary carriage pivotally mounted on said main carriage to tilt about an axis perpendicular to said screw; rotary transmission means on said auxiliary carriage to tilt with the auxiliary carriage between an idle position out of contact with both said discs and operating position in contact with both discs; and a control member parallel with said screw in contact with said auxiliary carriage, said control member being rotatable between an idle position and an operating position, said auxiliary carriage being tiltable about said perpendicular axis in response to rotation of said control member to shift said rotary transmission means between its idle position and its operating position.

10. A combination as set forth in claim 9 in which said control member is of non-circular cross-sectional configuration and is in sliding contact with a portion of said auxiliary carriage that is spaced from said perpendicular axis.

11. A combination as set forth in claim 10 in which two portions of said auxiliary carriage on opposite sides of said perpendicular axis straddle said control member in sliding contact therewith.

12. A combination as set forth in claim 10 in which said auxiliary carriage is shifted from its operating position to its normal position in response to rotation of said control means from its operating position to its normal position; which includes yielding means to urge said control means from its operating position to its idle position; and which includes latch means to hold said control means in its operating position in opposition to said yielding means.

13. In a variable speed device of the character described, the combination of: a rotary drive disc; an intermediate rotary idler disc; a rotary driven disc, said discs being in parallel planes with both the driven disc and the drive disc facing the intermediate idler disc; a first rotary transmission means to transmit rotation from said drive disc to said idler disc; a second rotary transmission means to transmit rotation from said idler disc to said driven disc; means to move said two rotary transmission means in unison along a path radially of all three discs to vary the rotation of said driven disc relative to said drive disc; and means extending parallel to said path to retract both of said rotary transmission means out of operating contact with the discs.

14. A combination as set forth in claim 13 in which each of said two rotary transmission means comprises an axially elongated rotary means, said rotary means being tiltable between an operating position in contact with the two discs associated therewith and an idle position out of contact with the two discs.

15. A combination as set forth in claim 14 which includes a lead screw parallel with said path; a main carriage in threaded engagement with said lead screw for movement longitudinally thereof; and a pair of auxiliary carriages rotatably mounted on said main carriage to tilt relative thereto, said two rotary transmission means being journalled in said two auxiliary carriages respectively to tilt therewith.

16. A combination as set forth in claim 15 which includes an elongated control member parallel with said lead screw, each of said auxiliary carriages being in sliding contact with said control member, said control member being of non-circular cross-sectional configuration and said two auxiliary carriages being tiltable in response to rotation of the control member.

References Cited in the file of this patent
UNITED STATES PATENTS

| | | |
|---|---|---|
| 664,028 | Ryd | Dec. 18, 1900 |
| 970,190 | De Loach | Sept. 13, 1910 |
| 1,050,351 | Dean | Jan. 14, 1913 |
| 1,220,554 | Reher | Mar. 27, 1917 |
| 2,552,751 | Van Leeuwen | May 15, 1951 |